UNITED STATES PATENT OFFICE.

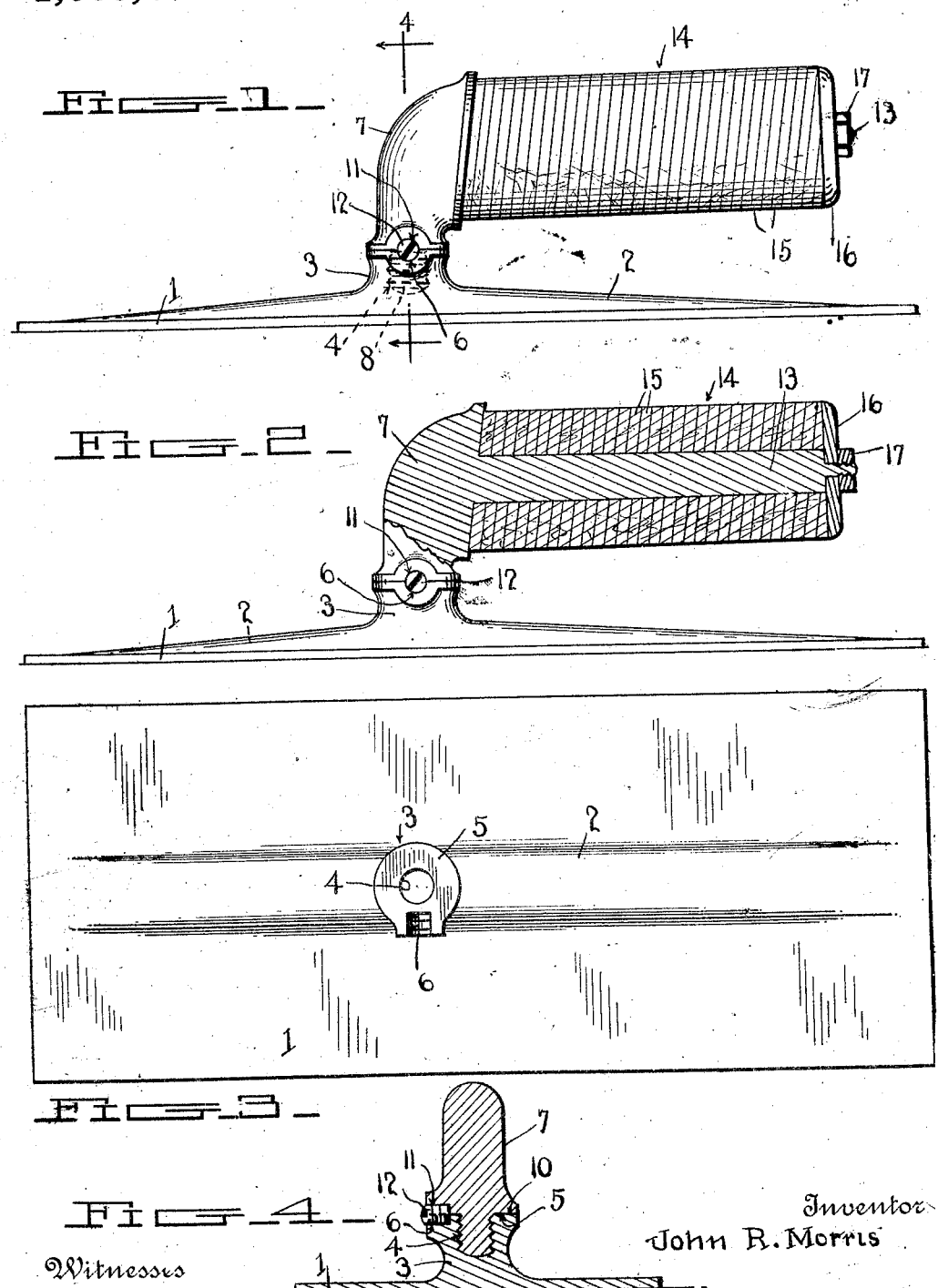

JOHN R. MORRIS, OF WATERLOO, IOWA.

TROWEL.

1,005,279.

Specification of Letters Patent. Patented Oct. 10, 1911.

Application filed September 22, 1910. Serial No. 583,274.

*To all whom it may concern:*

Be it known that I, JOHN R. MORRIS, a citizen of the United States, residing at Waterloo, in the county of Blackhawk and State of Iowa, have invented certain new and useful Improvements in Trowels; and I do declare the following to be a full, clear, and exact description of the invention, such as will enable others skilled in the art to which it appertains to make and use the same.

This invention relates to improvements in plastering trowels or floats.

One object of the invention is to provide a trowel of this character having a blade and handle attaching socket formed in one piece.

Another object is to provide an improved means for detachably securing the handle to the blade.

With these and other objects in view, the invention consists of certain novel features of construction, combination and arrangement of parts as will be more fully described and particularly pointed out in the appended claim.

In the accompanying drawings, Figure 1 is a side view of a trowel constructed in accordance with my invention. Fig. 2 is a similar view partly in section. Fig. 3 is a top plan view of the trowel with the handle removed. Fig. 4 is a vertical cross sectional view on the line 4—4 of Fig. 1.

Referring more particularly to the drawings 1 denotes the blade of my improved trowel said blade having formed integral therewith a central longitudinally disposed bracing rib 2 which gradually decreases in width from the center of the blade toward the opposite ends thereof as shown.

In the center of the rib is formed a circular boss 3 having a centrally disposed threaded socket 4 and a flat upper surface which forms a seat 5 for a handle shank hereinafter described. In the flat upper surface of the boss and opening through one side of the same is a threaded semi-circular recess 6 which forms one half of a socket adapted to receive a set screw whereby the handle is locked in operative engagement with the blade.

The handle of the trowel comprises a head 7 having on one end a reduced threaded shank 8 adapted to be screwed into engagement with the socket 4 and having a flat circular bearing surface 10 adapted to be engaged with the seat 5 whereby a firm connection is provided between the head 7 and the blade.

In the bearing surface 10 of the head is formed a threaded semicircular recess 11 which when the head is engaged with seat 5 of the boss, alines with the recess 6 in said seat and forms the set screw socket hereinbefore referred to. With the socket thus formed is adapted to be engaged a set screw 12 which locks the head to the boss and thus rigidly secures the handle in operative position.

On the head 7 is formed a reduced right angularly projecting stem 13. On the stem 13 is arranged a handle 14 which is formed of any suitable material but which is preferably constructed of fiber arranged on the stem in the form of a series of circular disks 15 as shown. The disks 15 are clamped into tight engagement with each other by a clamping plate 16 arranged on the reduced outer end of the stem. The reduced outer end of the stem is threaded and has engaged therewith, a clamping nut 17 which when screwed up firmly clamps the plate against the disks 15 and thus binds the latter together to form a composite structure. The disks are preferably arranged on the stem at an angle as shown.

By forming the blade and handle in the manner described the use of rivets or similar fastening devices for the handle is entirely dispensed with and a strong and durable connection provided between the handle and the blade. This fastening of the blade also obviates all possibility of any part of float projecting below or on the working side of the blade.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claim.

Having thus described my invention, what I claim is:

A trowel comprising a blade having an integral longitudinal rib, an upstanding boss projecting from the center of the latter and having a flat upper end and a screw threaded socket, a detachable handle having a screw threaded stem engaging said socket and a flat shoulder surrounding the stem for binding contact with the flat upper end of the boss, the face of the flat end of the latter and the shoulder of the stem being provided with semi-circular threaded recesses for registering engagement forming a screw threaded socket, and an adjustable screw in the socket thus formed for preventing the handle from turning and becoming released.

In testimony whereof I have hereunto set my hand in presence of two subscribing witnesses.

JOHN R. MORRIS.

Witnesses:
H. W. HALLOWELL,
M. B. NEFF.